(12) United States Patent
Lu

(10) Patent No.: US 7,265,689 B2
(45) Date of Patent: Sep. 4, 2007

(54) DATA TRANSFORMATION APPARATUS AND METHOD FOR TRANSFORMING DATA BLOCK

(75) Inventor: Chung-Yen Lu, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 336 days.

(21) Appl. No.: 11/017,568

(22) Filed: Dec. 20, 2004

(65) Prior Publication Data

US 2005/0141633 A1    Jun. 30, 2005

(30) Foreign Application Priority Data

Dec. 26, 2003  (TW)  .............................. 92137184 A

(51) Int. Cl.
*H03M 5/00* (2006.01)

(52) U.S. Cl. ........................................................ 341/58

(58) Field of Classification Search .................. 341/58, 341/59, 67, 68; 369/47.19; 375/253
See application file for complete search history.

(56) References Cited

U.S. PATENT DOCUMENTS 4,486,739 A    12/1984  Franaszek et al.
5,179,676 A  *  1/1993  Kashima ..................... 711/212
5,825,824 A    10/1998  Lee et al.
5,974,464 A    10/1999  Shin et al.
6,026,124 A     2/2000  Lee et al.
6,965,329 B2 * 11/2005  Nakagawa et al. ........... 341/58

* cited by examiner

*Primary Examiner*—Brian Young
(74) *Attorney, Agent, or Firm*—Hoffman, Warnick & D'Alessandro LLC

(57) ABSTRACT

The present invention provides a data transformation apparatus for transforming a first data block into a second data block. The first data block comprises a predetermined number of bits. The data transformation apparatus comprises a control bit module, a processing module, and a selection module. The control bit module is used for generating a plurality of control bit sets, wherein each control bit set represents a transformation procedure of the first data block. The processing module is used for receiving the first data block and the plural control bit sets, and accordingly for generating a plurality of first reference values. The selection module connects with the processing module and generates the second data block according to the plural first reference values and a predetermined judgment value.

18 Claims, 8 Drawing Sheets

Table 1

| m=1 | T=0 | T=1 | T=2 | T=3 | T=4 | T=5 | T=6 | T=7 |
|---|---|---|---|---|---|---|---|---|
| $T_{00}$ | 1 | 2 | 3 | 4 | 5 | 6 | 7 | 8 |
| $T_{01}$ | 8 | 7 | 6 | 5 | 4 | 3 | 2 | 1 |
| $T_{10}$ | 1 | 2 | 3 | 4 | 5 | 6 | 7 | 8 |
| $T_{11}$ | 8 | 7 | 6 | 5 | 4 | 3 | 2 | 1 |
| m=1 | T=0 | T=1 | T=2 | T=3 | T=4 | T=5 | T=6 | T=7 |
| $T_{00}$ | 0 | 1 | 2 | 3 | 4 | 5 | 6 | 7 |
| $T_{01}$ | 9 | 8 | 7 | 6 | 5 | 4 | 3 | 2 |
| $T_{10}$ | 2 | 3 | 4 | 5 | 6 | 7 | 8 | 9 |
| $T_{11}$ | 7 | 6 | 5 | 4 | 3 | 2 | 1 | 0 |

Table 2

| m=1 | T=0 | T=1 | T=2 | T=3 | T=4 | T=5 | T=6 | T=7 |
|---|---|---|---|---|---|---|---|---|
| $T_{00}$ | 1 | 2 | 3 | 4 | 5 |  |  |  |
| $T_{01}$ |  |  |  | 5 | 4 | 3 | 2 | 1 |
| $T_{10}$ | 1 | 2 | 3 | 4 | 5 |  |  |  |
| $T_{11}$ |  |  |  | 5 | 4 | 3 | 2 | 1 |
| m=1 | T=0 | T=1 | T=2 | T=3 | T=4 | T=5 | T=6 | T=7 |
| $T_{00}$ | 0 | 1 | 2 | 3 | 4 | 5 |  |  |
| $T_{01}$ |  |  |  | 5 | 4 | 3 | 2 |  |
| $T_{10}$ | 2 | 3 | 4 | 5 |  |  |  |  |
| $T_{11}$ |  |  | 5 | 4 | 3 | 2 | 1 | 0 |

DATA TRANSFORMATION APPARATUS AND METHOD FOR TRANSFORMING DATA BLOCK

BACKGROUND OF THE INVENTION

1. Field of the Invention

The present invention relates to a data transformation apparatus and the method thereof, especially to a data transformation apparatus and the method thereof for transforming data block.

2. Description of the Prior Art

For data processing or transmission, to reduce electromagnetic interference (EMI) and to achieve direct current (DC) balance have always been an important subject of research. If EMI is too high, the electronic signals of other circuits will be interfered, thus generating noise. In some digital transmission systems, two symbols are usually transmitted directly to represent logic 0 and logic 1, and they are also usually represented by the high and low of the voltage. To restrain EMI, the transitions between logic 0 and logic 1 should not be too frequent. DC balance can enable the total potential of the electronic signals to be maintained at the level of about zero, thus generating a steady reference voltage.

Referring to FIG. 1, FIG. 1 is a schematic diagram of the transformation apparatus 12 of the byte 10 of the prior art. U.S. Pat. No. 5,825,824 disclosed a transformation apparatus 12 of a byte 10 of the prior art for transforming the byte 10 to generate a data block 14 that conforms to low transition frequency and DC balance. The transformation apparatus 12 comprises a first processing module 16 and a second processing module 18. The first processing module 16 is used for calculating a transition frequency of two consecutive bits in the byte 10. According to the transition frequency and a predetermined standard value, the first processing module 16 further determines whether the conditional alternate bit inversion (CABI) calculation should be performed on the byte 10. The so-called CABI calculation is used for inverting the bits with even numbers in the byte 10. Whether the CABI calculation is performed on the byte 10 or not, the byte 10 is outputted to be a medium byte 20 and generate a transition bit 22.

The second processing module 18 is used for calculating the difference between the number of 1 and the number of 0 within the medium byte 20 to generate a number difference. According to the number difference and a difference accumulating value, the second processing module 18 further determines whether the conditional byte inversion (CTBI) should be performed on the medium byte 20. The so-called CTBI calculation is used for inverting all of the bits in the medium byte 20. Whether the CTBI calculation is performed or not, the medium byte 20 is outputted to be an output byte 24 and generate a mark bit 26. Before the output byte 24 is generated, the second processing module 18 calculates the difference between the number of 1 and the number of 0 within the output byte 24 in advance to generate a corresponding number difference, and then it sums up the corresponding number difference and the difference accumulating value to be the next difference accumulating value.

Then, the transition bit 22, the mark bit 26, and the output byte 24 are constructed to be the data block 14.

However, when the first processing module 16 calculates the transition frequency, and the second processing module 18 calculates the number difference, the influence of the transition bit 22 and the mark bit 26 is not being considered, thus resulting in the final data block 14 also comprising the transition bit 22 and the mark bit 26. As a result, the first processing module cannot make the best decision to determine whether the CABI calculation should be performed, and the second processing module 18 also cannot make the best decision to determine whether the CTBI calculation should be performed. Thus, the data block 14 generated by the transformation apparatus 12 cannot achieve the lowest transition and best DC balance.

SUMMARY OF THE INVENTION

The objective of the present invention is to provide a data transformation apparatus for solving the problem of the prior art.

The data transformation apparatus of the present invention is used for transforming a first data block into a second data block. The first data block is formed by a first predetermined number of bits. The data transformation apparatus comprises a control bit module, a processing module, and a selection module. The control bit module is used for generating a plurality of control bit sets, wherein each control bit set represents a transformation procedure of the first data block. The processing module is used for receiving the first data block and the plural control bit sets, and accordingly for generating a plurality of first reference values. The selection module connects with the processing module and generates the second data block according to the plural first reference values and a predetermined judgment value.

The data transformation apparatus of the present invention can transform the first data block into the second data block with low transition frequency and DC balance. Before the second data block is generated, the data transformation apparatus estimates in advance the influence from the transition and DC balance, which may occur after the second data block is generated, and then it transforms the first data block into the second data block according to the estimation. Therefore, the second data block generated and outputted by the data transformation apparatus of the present invention can certainly conform to low transition frequency and achieve DC balance.

The advantage and spirit of the invention may be understood by the following recitations together with the appended drawings.

BRIEF DESCRIPTION OF THE APPENDED DRAWINGS

Figure 5:
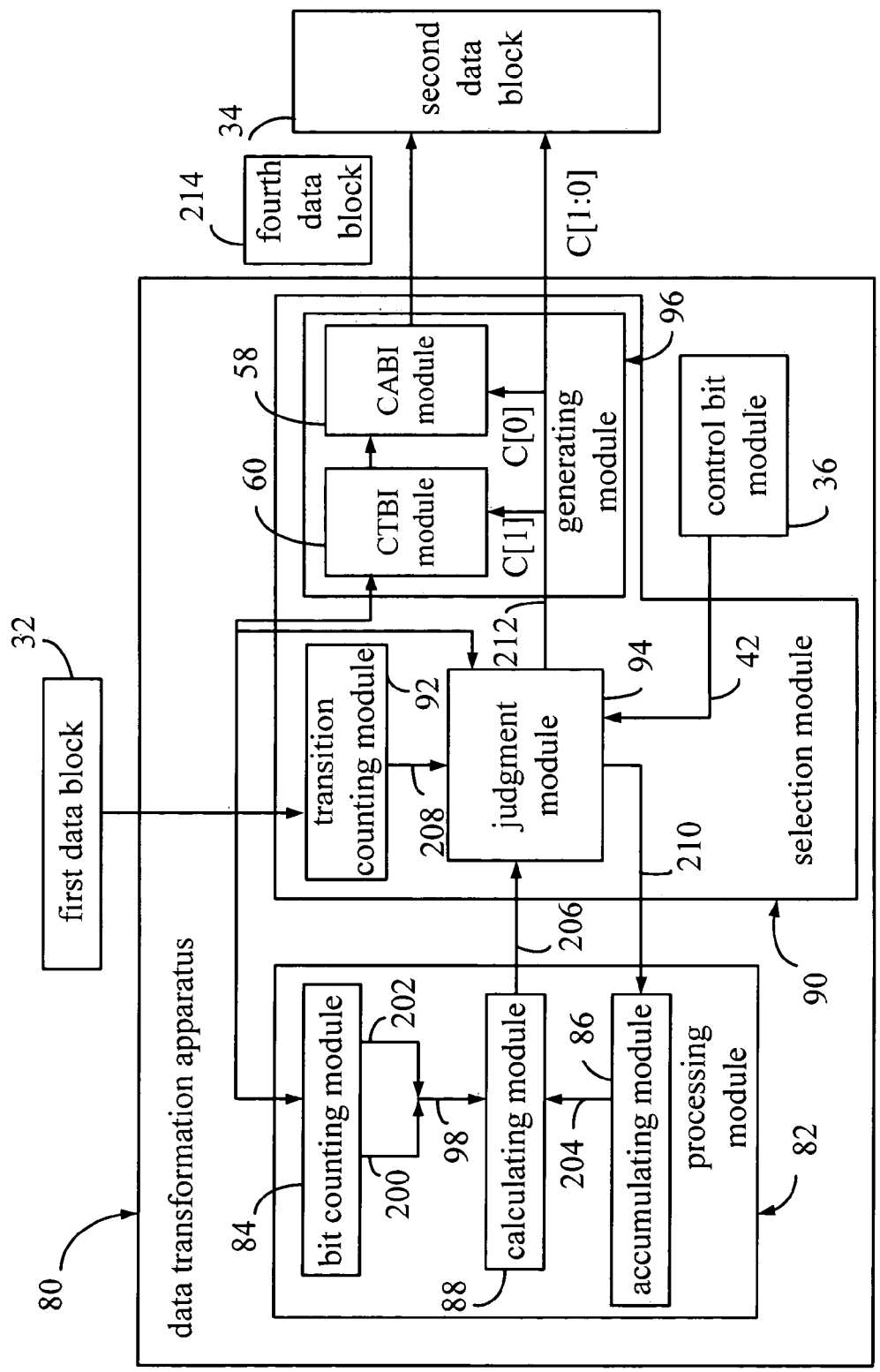
FIG. 5 is a schematic diagram of the data transformation apparatus of another embodiment according to the present invention.

Table 1 is a table of predetermined values of the data transformation apparatus shown in FIG. 5.

Table 2 is a table of transition reference values from table 1 that are smaller than or equal to 5.

Figure 6:
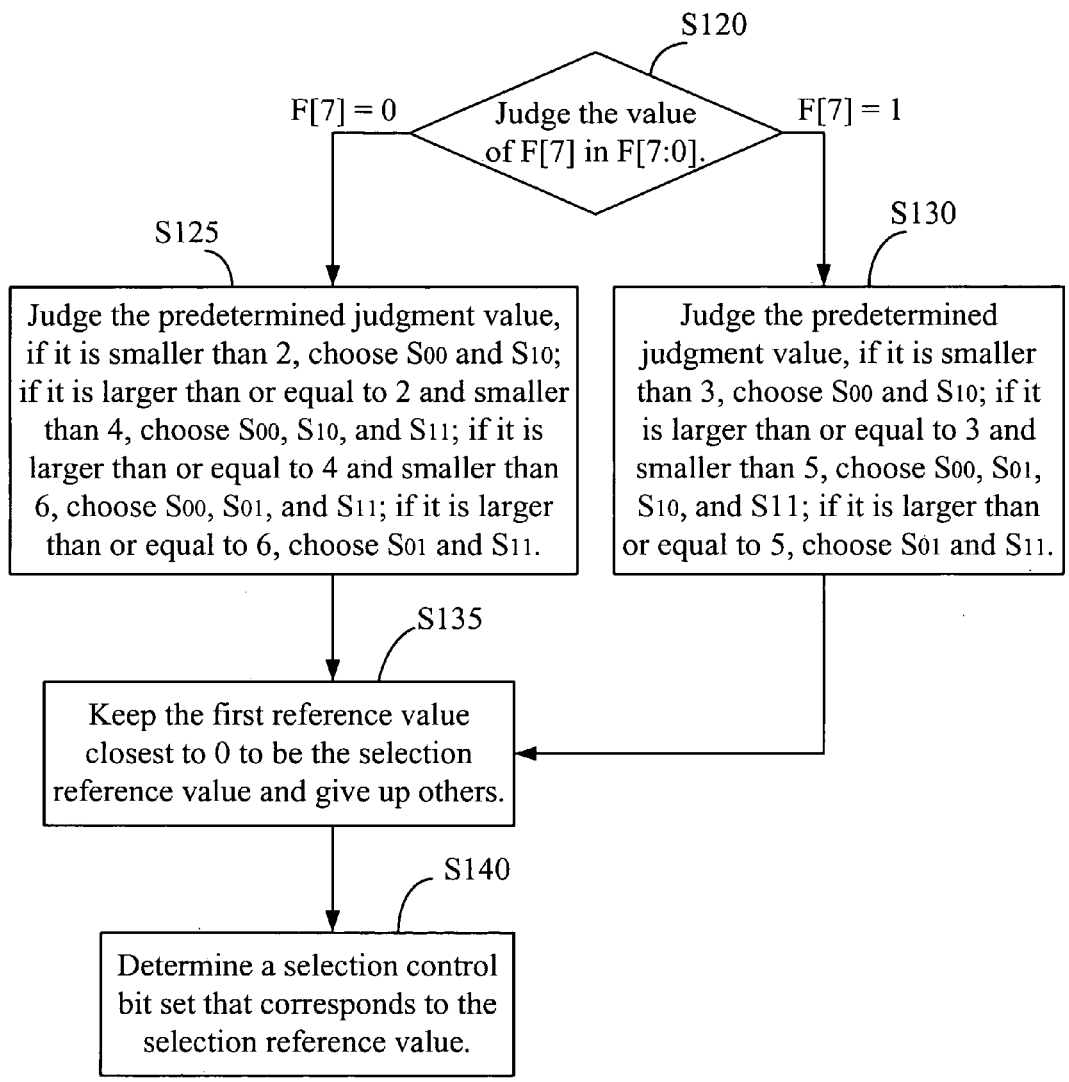

FIG. 6 is a flowchart of the judgment process of the judgment module shown in FIG. 5.

Figure 7:
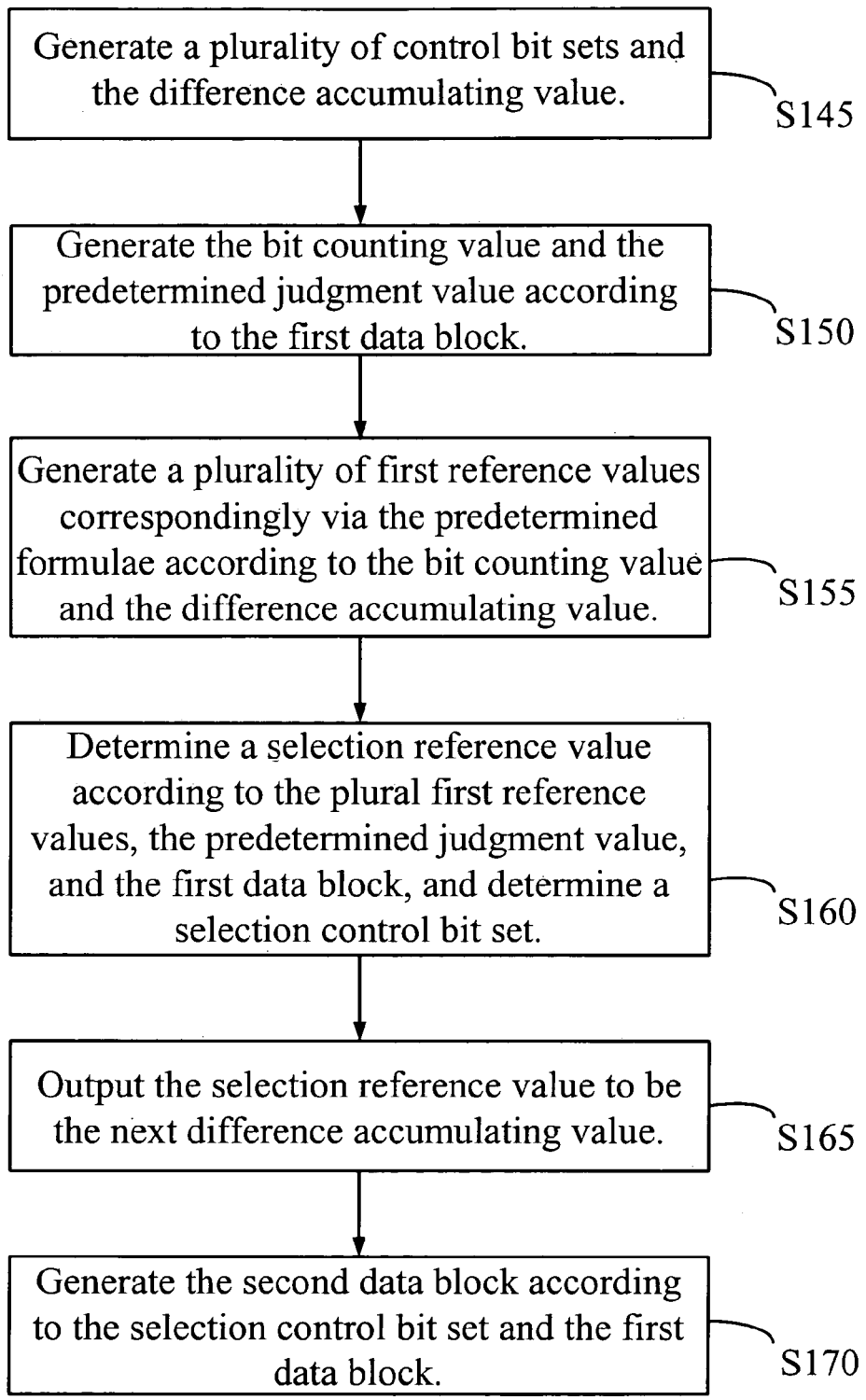

FIG. 7 is a flowchart of the data transformation process of the data transformation apparatus shown in FIG. 5.

DETAILED DESCRIPTION OF THE INVENTION

Figure 1:
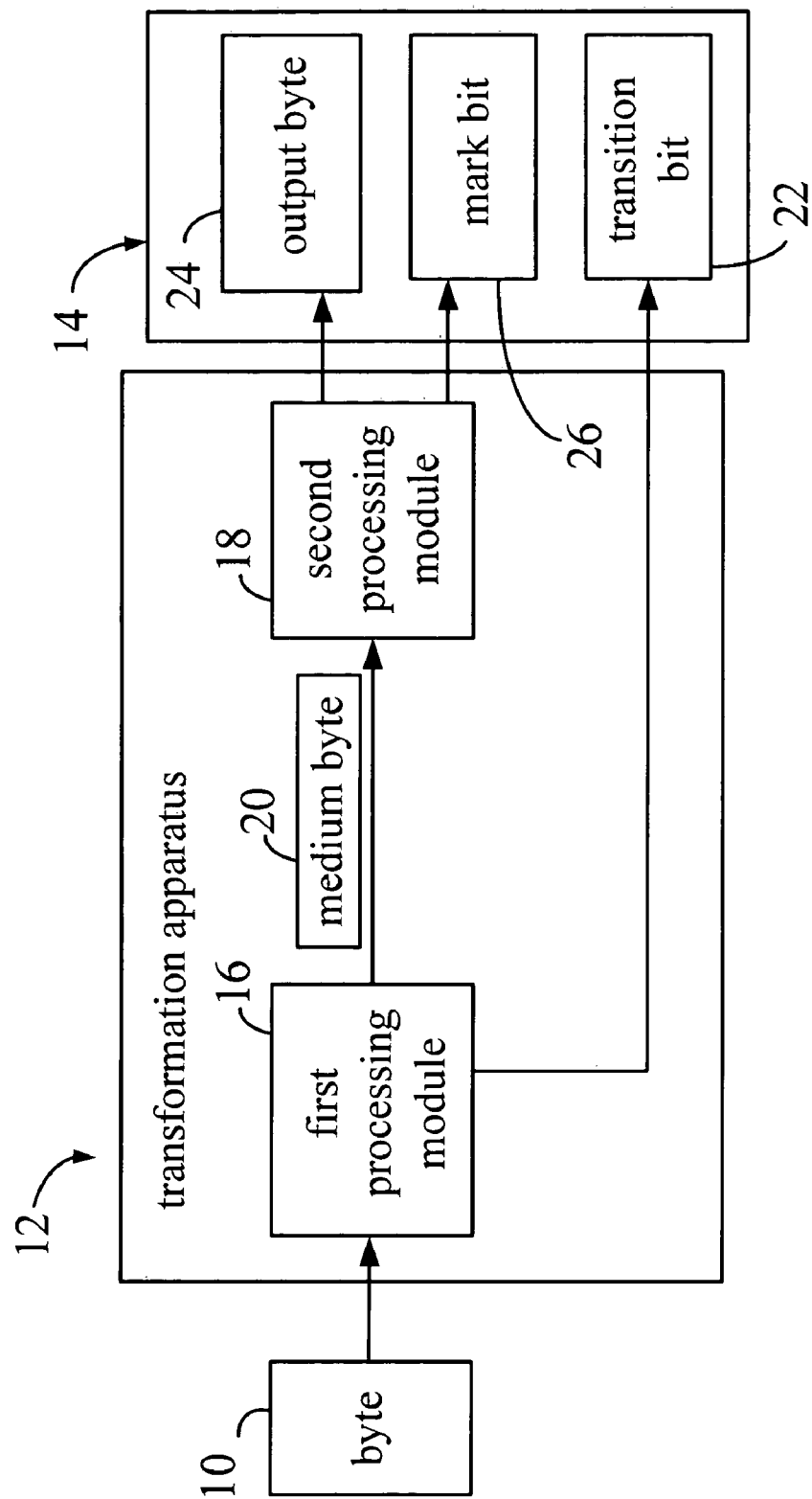
FIG. 1 is a schematic diagram of the transformation apparatus of the byte of the prior art.
Figure 2:
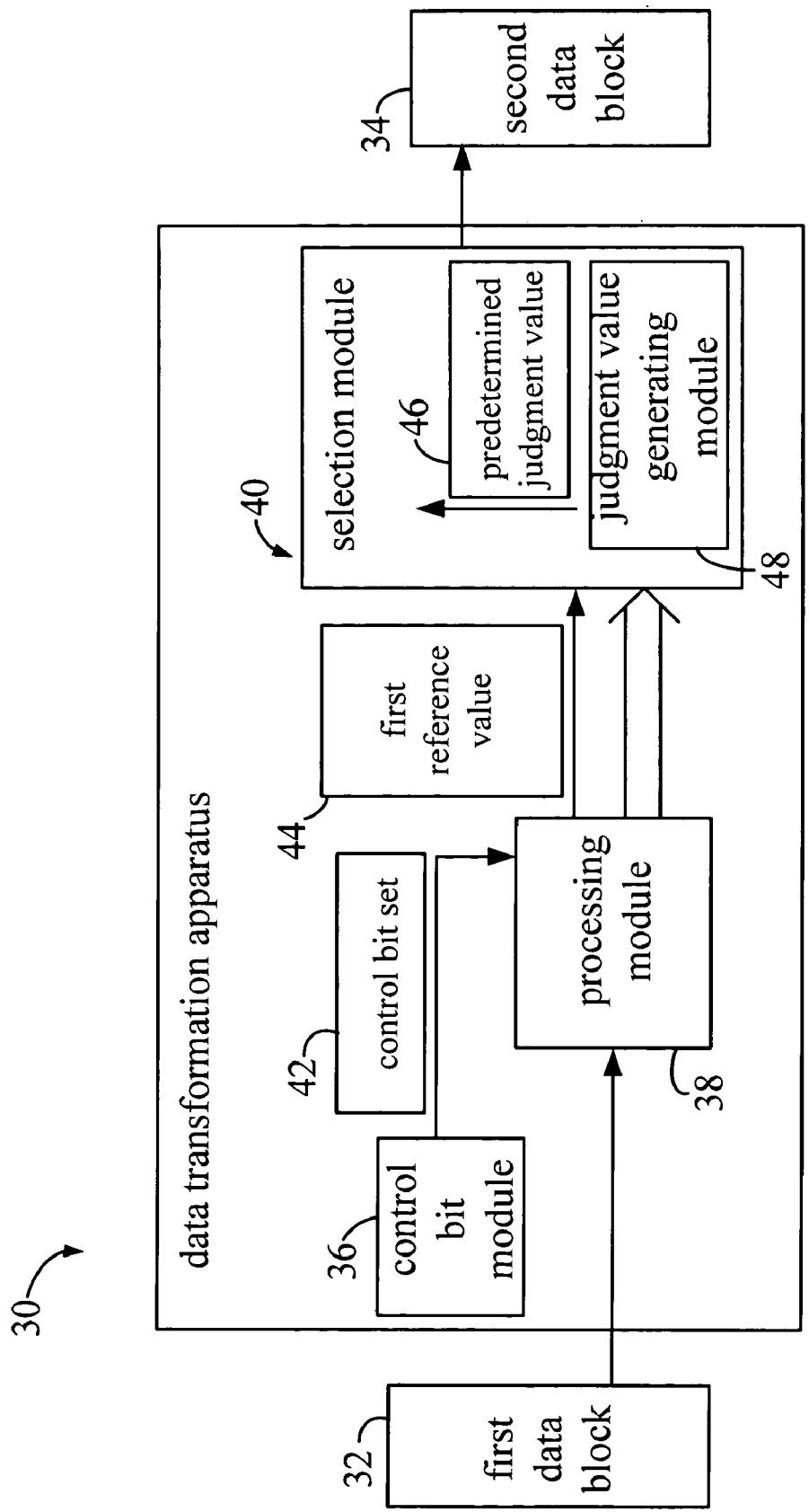
FIG. 2 is a schematic diagram of the data transformation apparatus of the first embodiment according to the present invention.

Referring to FIG. 2, FIG. 2 is a schematic diagram of the data transformation apparatus 30 of the first embodiment according to the present invention. The data transformation apparatus 30 of this embodiment is used for transforming a first data block 32 into a second data block 34. The first data block 32 is formed by a predetermined number of bits (not shown), and it is represented as F[7:0]. The second data block 34 is represented as E[9:0]. The data transformation apparatus 30 comprises a control bit module 36, a processing module 38, and a selection module 40.

The control bit module 36 is used for generating a plurality of control bit sets 42, wherein each control bit set 42 represents a transformation procedure of the first data block 32. In this embodiment, each of the control bit sets 42 is represented as C[1:0]. The processing module 38 is used for receiving the first data block 32 and the plural control bit sets 42, and accordingly for generating a plurality of first reference values 44. The selection module 40 connects with the processing module 38 and generates the second data block 34 (E[9:0]) according to the plural first reference values 44 and a predetermined judgment value 46. The predetermined judgment value 46 is generated by a judgment value generating module 48 comprised in the selection module 40.

Figure 3:
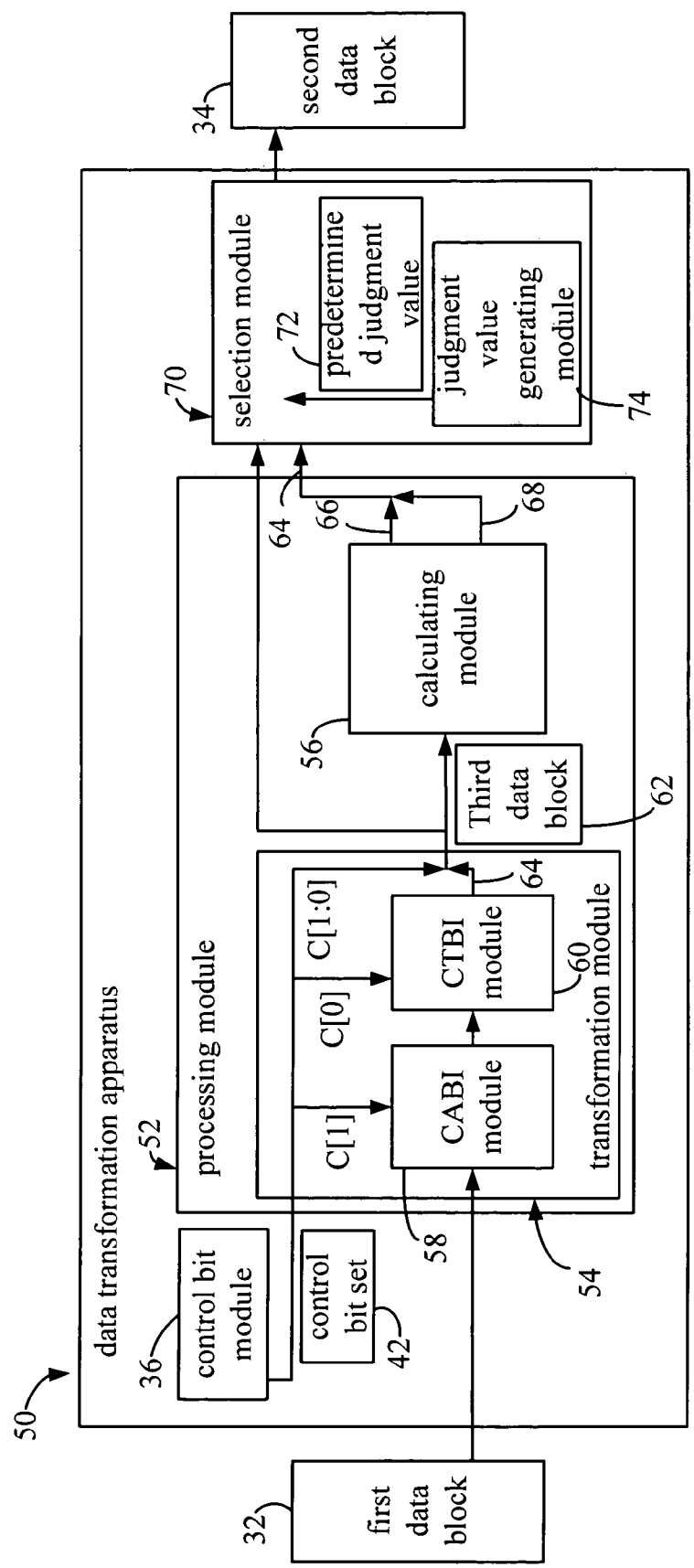
FIG. 3 is a schematic diagram of the data transformation apparatus of the second embodiment according to the present invention.

Referring to FIG. 3, FIG. 3 is a schematic diagram of the data transformation apparatus 50 of the second embodiment according to the present invention. In the data transformation apparatus 50, the processing module 52 comprises a transformation module 54 and a counting module 56. The transformation module 54 further comprises a conditional alternate bit inversion (CABI) module 58 and a conditional byte inversion (CTBI) module 60.

The transformation module 54 is used for receiving the first data block 32 (F[7:0]) and the plural control bit sets 42 (C[1:0]), and accordingly for generating a plurality of third data blocks 62. Each of the third data blocks 62 is represented as T[9:0] and comprises the control bit sets, which corresponds to the control bit sets 42, and a transforming data block 64. The corresponding control bit sets 42 (C[1:0]) becomes T[9:8], and the transforming data block 64 becomes T[7:0]. The transforming data block 64 is generated by the corresponding control bit sets 42 and the first data block 32 (F[7:0]).

In the transformation module 54, the CABI module 58 is used for inverting the alternate bit within the received data, and the CTBI module 60 is used for inverting all the bits of the received data. The corresponding control bit set 42 of each of the third data blocks 62 (T[9:0]) can selectively controls the CABI module 58 and the CTBI module 60 to be in the modes of both non-operational, only one operational, or both operational, so as to enable the transformation module 54 to generate the transformation data block 64 of each of the third data blocks according to the corresponding control bit set 42 (C[1:0]) and the first data block 32 (F[7:0]).

According to this embodiment, in each of the control bit sets 42 (C[1:0]), C[1]=0 represents that the CABI module 58 is in non-operation; C[1]=1 represents that the CABI module 58 is in operation; C[0]=0 represents that the CTBI module 60 is in non-operation, and C[0]=1 represents that the CTBI module 60 is in operation. Therefore, if the corresponding control bit set 42 of each of the third data blocks 62 (T[9:0]) is {0,0}, the CABI module 58 and the CTBI module 60 are both in non-operation. In other words, F[7:0] is outputted as T[7:0] directly without being transformed. In the same way as mentioned above, if the corresponding control bit set 42 is {1,0}, F[7:0] is only transformed via the CABI module 58 and outputted as T[7:0]. If the corresponding control bit set 42 is {0,1}, F[7:0] is only transformed via the CTBI module 60 and outputted as T[7:0]. If the corresponding control bit set 42 is {1,1}, F[7:0] is transformed via the CABI module 58, then transformed via the CTBI module 60, and then outputted as T[7:0].

In the data transformation apparatus 50 shown in FIG. 3, the counting module 56 is used for receiving the plural third data blocks 62 (T[9:0]), which consists of T[7:0] and C[1:0], and for generating the plural corresponding first reference values 64. Each of the first reference values 64 comprises a transition reference value 66 and a difference reference value 68. The transition reference value 66 is a transition frequency of two consecutive bits in the third data block 62 (T[9:0]) corresponding to each first reference value. The difference reference value 68 is the difference between the number of a predetermined bit value (not shown) and a predetermined constant value (not shown) in the third data block 62 (T[9:0]) corresponding to each first reference value. The counting module 56 calculates the transition frequency of two consecutive bits and the difference between the number of the predetermined bits and the predetermined constant value in the third data block 62 (T[9:0]) corresponding to each first reference value 64, so as to correspondingly generate the transition reference value 66 and the difference reference value 68. In this embodiment, the predetermined bit value indicates the number of 1 in the corresponding T[9:0]. The predetermined constant value is 5, i.e. a half of the number of bits in T[9:0].

The second data block 34 (E[9:0]) generated by the selection module 70 is the one selected from the third data blocks 62 (T[9:0]). After receiving a plurality of first reference values 64 and a plurality of third data blocks 62 (T[9:0]), the selection module 70 first judges whether the transition reference value 66 is larger than or equal to a predetermined value. In this embodiment, the predetermined value is 5. The selection module 70 will give up the first reference value 64, which is corresponding to the transition reference value 66 that is larger than or equal to the predetermined value. Then, the selection module 70 sums up the difference reference value 68 of each of the remained first reference values 64 and the predetermined judgment value 72 to output the third data block 62 (T[9:0]) corresponding to the difference reference value 68 with the smallest sum, so as to be the second data block 34 (E[9:0]).

In the selection module 70, the judgment value generating module 74 generates the predetermined judgment value 72 via the following formula 1.

$$S_n = S_{n-1} + D_{n-1},\quad\text{Formula 1}$$

wherein $S_n$ represents the predetermined judgment value 72; $S_{n-1}$ represents the last predetermined judgment value 72 before $S_n$, and $D_{n-1}$ represents the difference reference value 68 corresponding to the last second data block 34 (E[9:0]).

In general, the data transformation apparatus 50 is used for continually transforming a plurality of first data blocks 32 (F[7:0]) into a plurality of corresponding second data blocks 34 (E[9:0]). Therefore, the predetermined judgment value 72 is the sum of the last predetermined judgment value 72 and the difference reference value 68 corresponding to the last second data block 34 (E[9:0]). If only one first data block 32 (F[7:0]) needs to be processed, then $S_0=D_0=0$.

Figure 4:
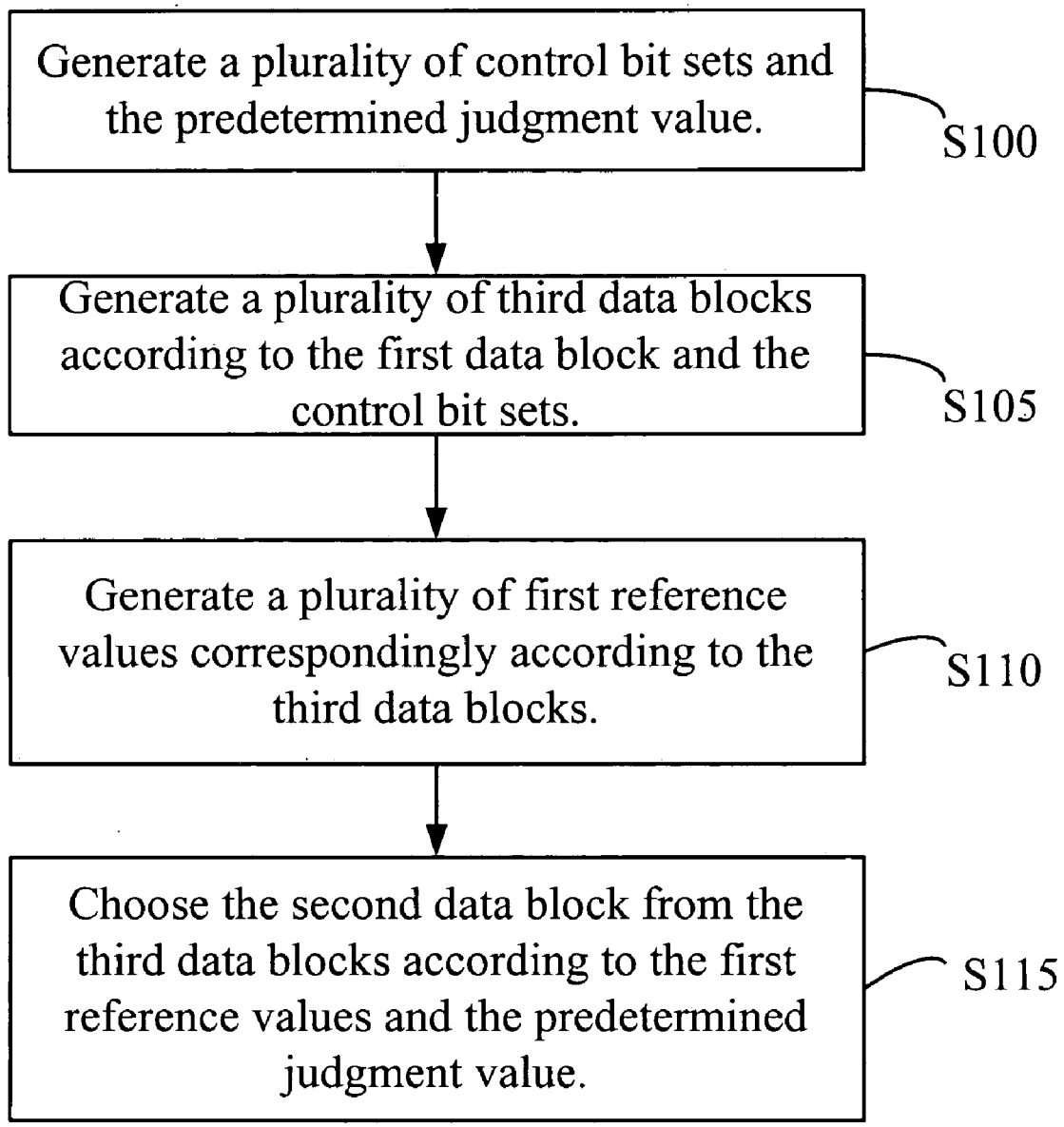
FIG. 4 is a flowchart of the data transformation of the data transformation apparatus shown in FIG. 3.

Referring to FIG. 4, FIG. 4 is a flowchart of data transformation of the data transformation apparatus 50 shown in FIG. 3. The steps of data transformation of the data transformation apparatus 50 are as follows:

Step S100: Generate a plurality of control bit sets 42 and the predetermined judgment value 72.

Step S105: Generate a plurality of third data blocks 62 (T[9:0]) according to the first data block 32 (F[7:0]) and the control bit sets 42 (C[1:0]).

Step S110: Generate a plurality of first reference values 64 correspondingly according to the third data blocks 62 (T[9:0]).

Step S115: Choose the second data block 34 (E[9:0]) from the third data blocks 62 (T[9:0]) according to the first reference values 64 and the predetermined judgment value 72.

Referring to FIG. 3, in the transformation module 54 of the data transformation apparatus 50, C[1] represents whether the CABI module 58 is in operation, and C[0] represents whether the CTBI module 60 is in operation. In another embodiment, C[1] represents whether the CTBI module 60 is in operation, and C[0] represents whether the CABI module 58 is in operation. The procedure for processing F[7:0] is the same.

Referring to FIG. 5, FIG. 5 is a schematic diagram of the data transformation apparatus 80 of another embodiment according to the present invention. In the data transformation apparatus 80, the processing module 82 comprises a bit counting module 84, an accumulating module 86, and a calculating module 88. The selection module 90 comprises a transition counting module 92, a determining module 94, and a generating module 96. The generating module 96 comprises a CABI module 58 and a CTBI module 60.

The bit counting module 84 is used for receiving the first data block 32 (F[7:0]) and for generating a bit counting value 98. The bit counting value 98 is the number of the predetermined bit value (not shown) in the first data block 32 (F[7:0]). The bit counting value 98 comprises an odd bit value 200 and an even bit value 202, wherein the odd bit value 200 is the number of 1 in F[7], F[5], F[3], and F[1], and the even bit value 202 is the number of 1 in F[6], F[4], F[2], and F[0]. The accumulating module 86 is used for generating a difference accumulating value 204. The method for generating the difference accumulating value 204 will be described in the following. The calculating module 88 is used for receiving the bit counting value 98 and the difference accumulating value 204 and for generating the corresponding first reference values 206 according to a plurality of predetermined calculating formulae (not shown). Each of the predetermined calculating formulae corresponds to one of the plural control bit sets 42.

In each of the control bit sets 42 (C[1:0]), C[1] represents whether the CTBI module 60 is in operation, and C[0] represents whether the CABI module 58 is in operation. The control bit sets 42 have four kinds of formats: {0,0}, {1,0}, {0,1}, and {1,1}. Each kind of the control bit sets 42, which represents the operation manner of the CABI module 58 and the CTBI module 60, is the same as the above mentioned in the data transformation apparatus 50, so it won't be described again.

In the data transformation apparatus 80, the calculating module 88 receives the bit counting value 98 and the difference accumulating value 204 and generates the corresponding first reference values 206 according to a plurality of predetermined calculating formulae. The predetermined calculating formulae comprise the following formulae 2 through 5:

$$S_{00}=S+C_a+C_b-5, \qquad \text{Formula 2}$$

wherein $S_{00}$ represents the first reference value 206 corresponding to {0,0}; S represents the difference accumulating value 204; $C_a$ represents the odd bit value 200, and $C_b$ represents the even bit value 202.

$$S_{01}=S+C_a+C_b, \qquad \text{Formula 3}$$

wherein $S_{01}$ represents the first reference value 206 corresponding to {0,1}.

$$S_{10}=S-C_a-C_b+4, \qquad \text{Formula 4}$$

wherein $S_{10}$ represents the first reference value 206 corresponding to {1,0}.

$$S_{11}=S-C_a+C_b+1, \qquad \text{Formula 5}$$

wherein $S_{11}$ represents the first reference value 206 corresponding to {1,1}.

In formula 2 through 5, the generating module 96 transforms the first data block 32 (F[7:0]) into the virtual second data block 34 (E[9:0]) according to the control bit sets 42 corresponding to each of the formulae. In each of the formulae, the non-S part on the right of the equal sign is used for calculating a difference reference value of the virtual second data block 34 (E[9:0]). The difference reference value is generated according to the virtual second data block 34 (E[9:0]) and is different from the difference reference value 68, which is generated according to the third data block 62 (T[9:0]), in the data transformation apparatus 50. However, the significance of the difference reference value in this embodiment is the same with the difference reference value 68, and it won't be described again.

In the data transformation apparatus 80 shown in FIG. 5, the transition counting module 92 is used for generating the predetermined judgment value 208 according to the first data block 32 (F[7:0]). The predetermined judgment value 208 is the transition frequency of the two consecutive bits in the first data block 32 (F[7:0]). The determining module 94 is used for choosing a selection reference value 210 from the plural first reference values 206 according to the plural first reference values 206, the predetermined judgment value 208, and the first data block 32 (F[7:0]), and it is also used for choosing a selection control bit set 212 (C[1:0]), which corresponds to the selection reference value 210, from the plural control bit sets 42.

Referring to table 1, table 1 is a table of predetermined values of the data transformation apparatus 80 shown in FIG. 5. In the embodiment of the data transformation apparatus 80, the following formulae 6 through 9 are used for calculating all transition reference values possibly generated by each of the virtual second data blocks 34 (E[9:0]).

$$T_{00}=T+m, \qquad \text{Formula 6}$$

wherein $T_{00}$ represents the transition reference value corresponding to {0,0}, T represents the predetermined judgment value 208, and m represents F[7].

$$T_{01}=9-T-m, \qquad \text{Formula 7}$$

wherein $T_{01}$ represents the transition reference value corresponding to {0,1}.

$$T_{10}=2+T-m, \qquad \text{Formula 8}$$

wherein $T_{10}$ represents the transition reference value corresponding to {1,0}.

$$T_{11}=7-T+m, \quad \text{Formula 9}$$

wherein $T_{11}$ represents the transition reference value corresponding to {1,1}.

In this embodiment of the data transformation apparatus 80, the transition reference value is generated according to the virtual second data block 34 (E[9:0]) and is different from the transition reference value 66, which is generated according to the third data block 62 (T[9:0]), in the data transformation apparatus 50. However, the significance of the transition reference value in this embodiment is the same with the transition reference value 66, and it won't be described again.

Referring to table 2, table 2 is a table of the transition reference values from table 1 that are smaller than or equal to 5. When m and T are known, the remaining transition reference values can be obtained by looking into table 2. The first reference value 206, which corresponds to the control bit set 42 corresponding to the remaining transition reference values, can be calculated via formulae 2 through 5.

Referring to FIG. 6, FIG. 6 is a flowchart of the judgment process of the judgment module 94 shown in FIG. 5. After each of the first reference values 206 is obtained, the judgment module 94 will perform the judgment process according to the plural first reference values 206, the predetermined judgment value 208, and the first data block 32 (F[7:0]). The steps, in which the judgment module 94 performs the judgment process, are as follows:

Step S120: Judge the value of F[7] in F[7:0]; if it is a 0, go to step S125, and if it is a 1, go to step S130.

Step S125: Judge the predetermined judgment value 208; if it is smaller than 2, choose $S_{00}$ and $S_{10}$; if it is larger than or equal to 2 and smaller than 4, choose $S_{00}$, $S_{10}$, and $S_{11}$; if it is larger than or equal to 4 and smaller than 6, choose $S_{00}$, $S_{01}$, and $S_{11}$; if it is larger than or equal to 6, choose $S_{01}$ and $S_{11}$; go to step S135 after choosing.

Step S130: Judge the predetermined judgment value 208; if it is smaller than 3, choose $S_{00}$ and $S_{10}$; if it is larger than or equal to 3 and smaller than 5, choose $S_{00}$, $S_{01}$, $S_{10}$, and $S_{11}$; if it is larger than or equal to 5, choose $S_{01}$ and $S_{11}$.

Step S135: Keep the first reference value 206 closest to 0 from the chosen first reference values 206 to be the selection reference value 210 and give up others.

Step S140: Determine a selection control bit set 212 that corresponds to the selection reference value 210 from the plural control bit sets 42.

In the data transformation apparatus 80, the generating module 96 receives the selection control bit set 212 and the first data block 32 (F[7:0]), and then it generates the second data block 34 (E[9:0]). The generating module 96 comprises the CTBI module 60 and the CABI module 58. The selection control bit set 212 selectively controls the CABI module 58 and the CTBI module 60 to be in the modes of both non-operational, only one operational, or both operational. In other words, in the selection control bit sets 212 (C[1:0]), C[1]=0 represents that the CTBI module 60 is in non-operation; C[1]=1 represents that the CTBI module 60 is in operation; C[0]=0 represents that the CABI module 58 is in non-operation, and C[0]=1 represents that the CABI module 58 is in operation. Therefore, under the control of the selection control bit sets 212, the first data block 32 (F[7:0]) is first transformed via the CTBI module 60, then transformed via the CABI module 58, and then transformed into a fourth data block 214. Finally, the fourth data block 214 is combined with the selection control bit set 212 to be the second data block 34 (E[9:0]).

In this embodiment, the data transformation apparatus 80 is usually used to continually transform a plurality of first data blocks 32 (F[7:0]) into a plurality of second data blocks 34 (E[9:0]) correspondingly. Therefore, the current difference accumulating value 204 is the previous selection reference value 210, and the current selection reference value 210 is outputted to be the next difference accumulating value 204. If only one first data block 32 (F[7:0]) needs to be processed, the difference accumulating value 204 is 0.

Referring to FIG. 7, FIG. 7 is a flowchart of the data transformation process of the data transformation apparatus 80 shown in FIG. 5. The steps of the data transformation process of the data transformation apparatus 80 are as follows:

Step S145: Generate a plurality of control bit sets 42 and the difference accumulating value 204.

Step S150: Generate the bit counting value 98 and the predetermined judgment value 208 according to the first data block 32 (F[7:0]).

Step S155: Generate a plurality of first reference values 206 correspondingly via the predetermined formulae according to the bit counting value 98 and the difference accumulating value 204.

Step S160: Determine a selection reference value 210 from the plural first reference values 206 according to the plural first reference values 206, the predetermined judgment value 208, and the first data block 32 (F[7:0]), and determine a selection control bit set 212, which corresponds to the selection reference value 210, from the plural control bit sets 42.

Step S165: Output the selection reference value 210 to be the next difference accumulating value 204.

Step S170: Generate the second data block 34 (E[9:0]) according to the selection control bit set 212 and the first data block 32 (F[7:0]).

Referring to FIG. 5, in the selection control bit set 212 of the data transformation apparatus 80, C[1] represents whether the CTBI module 60 is in operation, and C[0] represents whether the CABI module 58 is in operation. The first reference value 206 is calculated via the formulae 2 through 5, and the transition reference value is calculated via the formulae 6 through 9. In another embodiment (not shown), C[1] represents whether the CABI module 58 is in operation, and C[0] represents whether the CTBI module 60 is in operation. However, in this embodiment, the formulae for calculating the first reference value and the transition reference value are different from the embodiment of the data transformation apparatus 80. The formulae 3, 4, 7, and 8 are respectively modified as formulae 3A, 4A, 7A, and 8A as follows. The rest is the same with the embodiment of the data transformation apparatus 80, and it won't be described again.

$$S_{01}=S-C_a-C_b+4, \quad \text{Formula 3A}$$

wherein $S_{01}$ represents the first reference value 206 corresponding to {0,1}.

$$S_{10}=S+C_a+C_b, \quad \text{Formula 4A}$$

wherein $S_{10}$ represents the first reference value 206 corresponding to {1,0}.

$$T_{01}=2+T-m, \quad \text{Formula 7A}$$

wherein $T_{01}$ represents the transition reference value corresponding to $\{0,1\}$.

$$T_{10}=9-T-m,\qquad \text{Formula 8A}$$

wherein $T_{10}$ represents the transition reference value corresponding to $\{1,0\}$.

According to the present invention, before the second data block 34 (E[9:0]) is generated, the data transformation apparatus 30, 50, 80 estimate in advance the influence on the transition and DC balance, which will occur after the second data block 34 (E[9:0]) is generated, and then it transforms the first data block 32 (F[7:0]) into the second data block according to the estimation. Therefore, the second data block 34 (E[9:0]) generated and outputted by the data transformation apparatus of the present invention can certainly conform to low transition frequency and achieve DC balance.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A data transformation apparatus, for transforming a first data block into a second data block, the first data block comprising a predetermined number of bits, the data transformation apparatus comprising:
    a control bit module for generating a plurality of control bit sets, wherein each control bit set represents a transformation procedure of the first data block;
    a processing module for receiving the first data block and the plural control bit sets, and accordingly generating a plurality of first reference values; and
    a selection module, connecting with the processing module, and generating the second data block according to the plural first reference values and a predetermined judgment value.

2. The data transformation apparatus of claim 1, comprising:
    a transformation module for receiving the first data block and the plural control bit sets, and accordingly generating a plurality of third data blocks, wherein each third data block comprises the plurality of control bit sets, which corresponds to the control bit sets and a transforming data block, wherein the transforming data block is generated by the control bit sets and the first data block; and
    a counting module for receiving the plural third data blocks, and correspondingly generating the plural first reference values.

3. The data transformation apparatus of claim 2, wherein each of the first reference values comprises a transition reference value which is a transition frequency of two consecutive bits in the third data block corresponding to each first reference value.

4. The data transformation apparatus of claim 3, wherein each of the first reference values further comprises a difference reference value, and the difference reference value is the difference of the number of a predetermined bit and a predetermined constant value in the third data block corresponding to each first reference value.

5. The data transformation apparatus of claim 4, wherein the transformation module further comprises a conditional alternate bit inversion module and a conditional byte inversion module, and wherein the corresponding control bit set of each of the third data blocks selectively controls the conditional alternate bit inversion module and the conditional byte inversion module to be in the modes of both non-operational, only one operational, or both operational, so as to enable the transformation module to generate the transformation data block of each of the third data blocks according to the corresponding control bit set and the first data block.

6. The data transformation apparatus of claim 5, wherein the second data block generated by the selection module is selected from one of the plural third data blocks.

7. The data transformation apparatus of claim 1, wherein the processing module comprises:
    a bit counting module, for receiving the first data block, and generating a bit counting value;
    an accumulating module for generating a difference accumulating value; and
    a calculating module for receiving the bit counting value and the difference accumulating value, and generating the plural corresponding first reference values according to a plurality of predetermined calculating formulae, wherein each of the predetermined calculating formulae corresponds to one of the plural control bit sets.

8. The data transformation apparatus of claim 7, wherein the selection module comprises:
    a transition counting module, for generating the predetermined judgment value according to the first data block;
    a determining module, for choosing a selection reference value from the plural first reference values according to the plural first reference values, the predetermined judgment value and the first data block, and choosing a selection control bit set which corresponds to the selection reference value from the plural control bit sets; and
    a generating module for receiving the selection control bit set and the first data block, and generating the second data block.

9. The data transformation apparatus of claim 8, wherein the generating module comprises a conditional alternate bit inversion (CABI) module and a conditional byte inversion (CTBI) module, and wherein the selection control bit set selectively controls the conditional alternate bit inversion module and the conditional byte inversion module to be in the modes of both non-operational, only one operational, or both operational.

10. The data transformation apparatus of claim 9, wherein the bit counting value comprises the number of the predetermined bit value in the first data block.

11. The data transformation apparatus of claim 10, wherein the predetermined judgment value is the transition frequency of the two consecutive bits in the first data block.

12. A data transformation method, for transforming a first data block into a second data block, the first data block comprising a first predetermined number of bits, the method comprising:
    generating a plurality of control bit sets, each of the plural control bit sets representing a transforming procedure of the first data block;
    generating a plural third data blocks according to the first data block and the plural control bit sets, wherein each third data block comprises a corresponding control bit set and a corresponding transforming data block, and the transforming data block is generated by the control bit set and the first data block;

generating plural first reference values correspondingly according to the plural third data blocks; and choosing the second data block from the plural third data blocks according to the plural first reference values and a predetermined judgment value.

13. The data transformation method of claim 12, wherein each of the plural first reference values comprises a transition reference value, and the transition reference value is a transition frequency of the two consecutive bits in the third data block corresponding to each first reference value.

14. The data transformation method of claim 13, wherein each first reference value further comprises a difference reference value, and the difference reference value is the difference of a predetermined bit value and a predetermined constant value in the third data block corresponding to each first reference value.

15. The data transformation method of claim 14, wherein the corresponding control bit set of each of the third data blocks selectively controls the first predetermined number of bits in the first data block, so that the transforming data block is generated by means of non-inversion in all bits, inversion only in consecutive bits, inversion in all bits, first inversion in consecutive bits and then again inversion in all bits, or first inversion in all bits and then inversion only in consecutive bits.

16. A data transformation method, for transforming a first data block into a second data block, the first data block comprising a first predetermined number of bits, the method comprising:

generating a plurality of control bit sets, each of the plural control bit sets representing a transforming procedure of the first data block;

generating a bit counting value according to the first data block;

generating a corresponding plural first reference values via a plural predetermined calculating formulae according to the bit counting value and a difference accumulating value, wherein each formula of the plural predetermined calculating formulae corresponds to one of the plural control bit sets;

generating a predetermined judgment value according to the first data block;

choosing a selection reference value from the plural first reference values according to the plural first reference values, the predetermined judgment value and the first data block, and determining a selection control bit set, which corresponds the selection reference value, from the plural control bit sets; and generating the second data block according to the selection control bit set and the first data block.

17. The data transformation method of claim 16, wherein the bit counting value is the number of the predetermined bit value in the first data block.

18. The data transformation method of claim 17, the predetermined bit value is the transition frequency of two consecutive bits in the first data block.

* * * * *